UNITED STATES PATENT OFFICE.

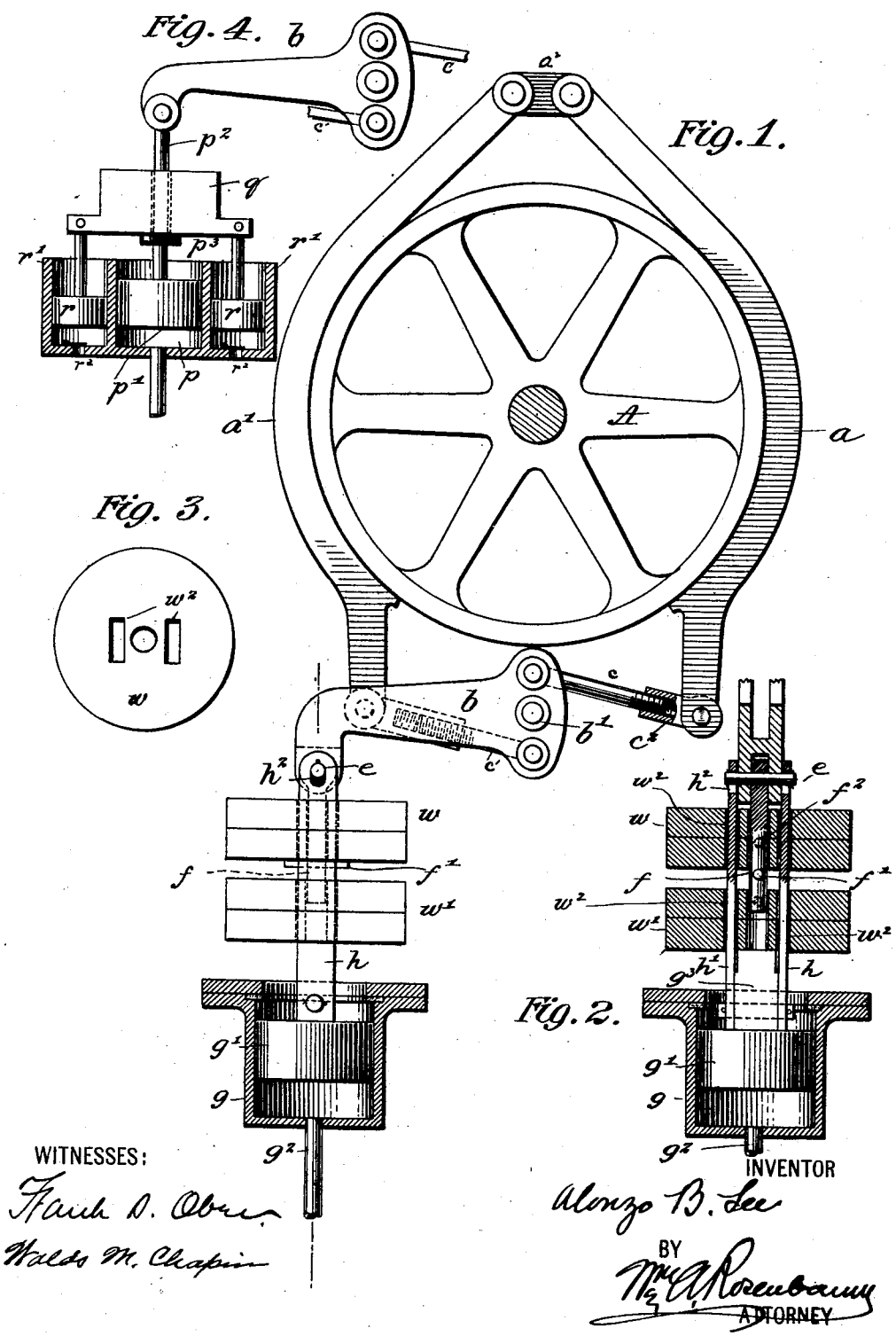

ALONZO B. SEE, OF BROOKLYN, NEW YORK, ASSIGNOR OF ONE-HALF TO WALTER L. TYLER, OF NEW YORK, N. Y.

ELEVATOR-BRAKE.

SPECIFICATION forming part of Letters Patent No. 678,352, dated July 9, 1901.

Application filed April 15, 1901. Serial No. 55,824. (No model.)

*To all whom it may concern:*

Be it known that I, ALONZO B. SEE, a citizen of the United States, residing at the city of New York, in the borough of Brooklyn and State of New York, have invented certain new and useful Improvements in Elevator-Brakes, of which the following is a full, clear, and exact description.

This invention relates to friction-brakes, and is designed for the purpose of providing means for bringing a moving vehicle to an accurate stop without jarring or seriously disturbing the lading regardless of the weight thereof. My improved brake is specially designed for use in connection with elevators wherein the actuating-machine is used to retard and stop the car as well as to propel it. It is the usual practice to provide in connection with such machines a brake which is applied at the moment when the actuating-machine has stopped or nearly stopped the car in order to overcome the remaining inertia and to hold the car at the point where it is stopped. A common form of brake for this purpose consists of a pair of straps or a single strap embracing the rim of a disk or drum and caused to grip the disk by means of a weight hanging upon a lever, the brake being released by any suitable means, such as electromagnetic or pneumatic devices for lifting the weight. The braking force used in such a brake is therefore a constant force and exerts the same braking stress in all cases regardless of the load in the elevator. In slow-speed elevators such a brake is very serviceable and satisfactory, since the amount of weight can be easily calculated to bring the elevator to an accurate stop regardless of the load in the car; but in high-speed elevators difficulty has been encountered in using such brakes in that when the load in the car is above the average the weight is insufficient to bring it to an accurate stop or after practically stopping the car will sag and move below the landing. If a heavier weight is used to prevent this, the high-speed car will be brought to a stop too suddenly, which will result in giving an unpleasant shock to the passengers. On the other hand, if the car is moving with a light load a weight which would stop it accurately with a heavy load would stop the car too suddenly and the same jarring would take place.

The present invention provides for applying first a small weight to the brake, which for small loads or loads up to the average will be sufficient to stop and hold the car, and shortly thereafter applying an additional weight, which becomes useful only in case there is a heavy load in the car and which operates only after the first weight has partially retarded the car. Thus the car, regardless of its load, is stopped accurately and without jarring.

The invention will be described in detail in connection with the accompanying drawings, in which—

Figure 1 is an elevation, partly in section, of the mechanism constituting my invention. Fig. 2 is a sectional view of the power-cylinder and weights. Fig. 3 is a plan of one of the weights, and Fig. 4 is a modification of the invention.

A represents a wheel or disk to which the braking force is applied, said wheel being mounted on the shaft of the elevator-machine.

$a$ and $a'$ are two strap-levers or brake-shoes adapted to bear against opposite sides of the disk and being pivoted at $a^2$.

$b$ is a lever pivoted at $b'$ and having a cross-head, to the opposite ends of which the links $c$ and $c'$ are connected, said links being connected at their opposite ends with the free ends of the straps $a$ and $a'$. These links are adjustable in length by means of the threaded socket $c^2$ for the purpose of adjusting the position of the levers $a$ and $a'$. The free end of lever $b$ carries a cross-pin $e$, which supports a rod $f$, and upon the rod are supported one or more weights $w$ in the form of disks, the center of the weights being perforated to allow the rod $f$ to pass through them and the weights being directly supported by a pin $f'$, passing through one of a number of lateral perforations $f^2$. These weights therefore, unless otherwise supported, exert a downward force upon the lever $b$.

$g$ is an air-cylinder containing a piston $g'$ and having a port $g^2$ for the inlet and exhaust of air. From the upper side of the piston there projects a central lug $g^3$, upon which rests one or more weights $w'$ of the same character as the weights $w$. Fixed to each side of the projection $g^3$ or to the end of the piston itself are two upwardly-extending parallel arms $h$ and $h'$. These pass through rectangular holes $w^2$ in all of the weights and engage with the ends of the pin $e$, there being slots $h^2$ in the end of each arm, into which said pin projects. It will therefore be seen that when there is no pressure beneath the piston $g'$ the piston and the weights $w'$ will be supported by the pin $e$ and will exert a downward force upon the lever $b$. The weights $w'$ are perforated centrally and are similar in construction to the weights $w$, so that one or more of the lower weights can be transferred to the upper group, and vice versa, by properly adjusting the pin $f'$ in the holes $f^2$.

In the position shown in the drawings both groups of weights are supported from the end of the lever $b$, and the brake-levers $a$ and $a'$ are held with a maximum pressure against the disk A. To release the brake, pressure is admitted beneath the piston $g$. This results in first lifting the weights $w'$, the arms $h$ and $h'$ traveling upward with respect to the pin $e$. As soon as the pin strikes the lower ends of slots $h^2$ the weights $w$ are also lifted, and the force being entirely removed from lever $b$ the brake is released. This successive removal of the weights takes place quickly and to all practical purposes is simultaneously accomplished. To apply the brake, the pressure is exhausted from cylinder $g$, whereupon the piston lowers and leaves the weights $w$ hanging upon the lever $b$, pending the traverse of the pin $e$ through the slots $h^2$. Weights $w$ therefore exert their force to apply the brake, which, in case the car contains only a light or the average load, will suffice to stop the car; but immediately thereafter the upper ends of the slots $h^2$ engage the pin $e$ and bring the additional weight $w'$ to bear upon lever $b$, which, in case the car is heavily loaded, will bring it to a stop and hold it stationary. The action of the first weight is sufficiently gentle to avoid jarring the lightly-loaded car and yet is sufficient to retard a heavily-loaded car, so that the second weight will complete the stop without a jar. In all applications of the brake both weights eventually act upon the lever of the brake; but the second weight is necessary only for the heavier loads. It is obvious that a larger number of weights may be used in each group and that the number or amount of weights in the respective groups can be altered to meet special conditions by shifting the weights in the manner hereinbefore described.

In Fig. 4 I have illustrated a modification of my invention wherein the brake is applied by the successive application of weights, but in releasing the brakes the total weight is lifted at once, there being no lost motion such as is created by the slot $h^2$ in the form shown in Fig. 1. In Fig. 3 one of the weights is indicated by the piston $p'$, located in the cylinder $p$. The piston-rod $p^2$ connects directly with the lever $b$, but is provided with a collar $p^3$ to receive and sustain a second weight $q$, adapted to slide upon the piston-rod. The weight $q$ is attached to the pistons $r$ by two dash-pots $r'$, air being admitted to the dash-pots on the upstroke of the piston through the valve $r^2$ and entrapped therein on the downstroke. The drawing shows both weights supported upon the piston-rod $p^2$ and the brakes applied. To release the brake, pressure is admitted to cylinder $p$, and both weights are raised simultaneously, thus at once releasing the pressure from the brake-shoes. In applying the brake the pressure is suddenly exhausted from cylinder $p$, which permits the weight $p'$ to fall quickly, while the weight $q$ is retarded by the air-cushions beneath the pistons $r$. The weight $q$ therefore does not exert any force upon the lever $b$ until it is lowered into contact with the collar $p^3$, which it is finally permitted to do by reason of the escape of air from the cylinder $r'$ past the pistons $r$. Then both weights hang from the lever and maximum braking force is applied.

Having described my invention, I claim—

1. In a friction-brake, the combination of a plurality of weights, and means whereby they may be successively applied to increase the friction of the brake in the application thereof.

2. In a friction-brake, the combination of a pivoted lever connected with the brake-shoes, a plurality of weights adapted to be suspended from said lever for the purpose of applying the brake, and means whereby said weights will be successively thrown onto the lever, substantially as described.

3. In a friction-brake, the combination of a lever connected with the brake-shoes, a piston, two weights adapted to act successively upon the lever to apply the brake, and means whereby the piston will remove the weights from the lever, substantially as described.

4. In a friction-brake, the combination of a lever connected with the brake-shoes, a plurality of weights adapted to be successively applied to said lever, and means whereby the weights may be substantially simultaneously released from said lever.

In witness whereof I subscribe my signature in presence of two witnesses.

ALONZO B. SEE.

Witnesses:
WM. A. ROSENBAUM,
WALDO M. CHAPIN.